(12) United States Patent
Ibrocevic et al.

(10) Patent No.: US 10,350,764 B2
(45) Date of Patent: Jul. 16, 2019

(54) MULTI-LAYER TACTILE SENSOR

(71) Applicant: PILZ GMBH & CO. KG, Ostfildern (DE)

(72) Inventors: Onedin Ibrocevic, Ostfildern (DE); Matthias Kuczera, Ostfildern (DE); Matthias Schweiker, Ostfildern (DE)

(73) Assignee: PILZ GMBH & CO. KG, Ostfildern (DE)

(*) Notice: Subject to any disclaimer, the term of this patent is extended or adjusted under 35 U.S.C. 154(b) by 0 days.

(21) Appl. No.: 15/962,604

(22) Filed: Apr. 25, 2018

(65) Prior Publication Data
US 2018/0319016 A1    Nov. 8, 2018

(30) Foreign Application Priority Data

May 3, 2017  (DE) .................. 10 2017 109 487

(51) Int. Cl.
*B25J 13/08*   (2006.01)
*H01H 3/14*   (2006.01)
(Continued)

(52) U.S. Cl.
CPC ............. *B25J 13/084* (2013.01); *B25J 19/06* (2013.01); *G01L 1/205* (2013.01); *G01L 1/2268* (2013.01); *G01L 5/0076* (2013.01); *H01H 3/141* (2013.01)

(58) Field of Classification Search
CPC ......... H01H 3/141; B25J 13/084; G01L 1/205
See application file for complete search history.

(56) References Cited

U.S. PATENT DOCUMENTS

| 4,492,949 A * | 1/1985 | Peterson | ................ B25J 13/084 338/114 |
| 5,798,703 A * | 8/1998 | Sakai | ....................... F16P 3/12 307/119 |

(Continued)

OTHER PUBLICATIONS

European Search Report for Appl'n No. EP 18 16 9303; dated Oct. 2, 2018; 8 pp.

*Primary Examiner* — Kyung S Lee
(74) *Attorney, Agent, or Firm* — Harness, Dickey & Pierce, P.L.C.

(57) ABSTRACT

A sensor assembly comprising first, second and third layers of flexible material forming, when superposed, a pressure-sensitive sensor having at least two sensor cells. The first layer comprises first and second electrically conductive regions mechanically connected to each other via an electrically non-conductive region. The second layer comprises a third electrically conductive region. The third electrically conductive region of the second layer overlaps the first and second electrically conductive regions of the first layer. The region of overlap defines an active region of a first and a second sensor cell. The third layer is formed of a conductive elastic material that cooperates under a local mechanical load in the active region with the first and second conductive regions of the first layer so that an electrical resistance between the electrical conductive regions changes in the place of the compressive load. Furthermore, the sensor assembly comprises a fixation adapted to fix the first and the second layers together. The fixation is arranged outside the active region so that the first and third layers lie unloaded on top of each other in the active region and the surfaces of the first and third layers facing each other are substantially free of a fixation.

13 Claims, 7 Drawing Sheets

(51) Int. Cl.
*B25J 19/06* (2006.01)
*G01L 1/20* (2006.01)
*G01L 5/00* (2006.01)
*G01L 1/22* (2006.01)

(56) References Cited

U.S. PATENT DOCUMENTS

| | | | | |
|---|---|---|---|---|
| 6,479,890 | B1* | 11/2002 | Trieu | H01L 23/5387 |
| | | | | 257/415 |
| 6,886,415 | B1* | 5/2005 | Kurogi | B25J 13/084 |
| | | | | 73/862.045 |
| 7,768,376 | B2* | 8/2010 | Liu | G01K 7/22 |
| | | | | 216/58 |
| 7,878,075 | B2* | 2/2011 | Johansson | B25J 13/084 |
| | | | | 73/862.046 |
| 9,851,269 | B2* | 12/2017 | Ibrocevic | F16P 3/12 |
| 2006/0175184 | A1* | 8/2006 | Grzan | H01H 3/141 |
| | | | | 200/85 R |
| 2006/0254369 | A1* | 11/2006 | Yoon | A61B 5/6804 |
| | | | | 73/862.041 |
| 2010/0176825 | A1* | 7/2010 | Kim | G01L 1/205 |
| | | | | 324/691 |
| 2010/0253626 | A1* | 10/2010 | Kim | G06F 3/0414 |
| | | | | 345/163 |
| 2014/0331412 | A1 | 11/2014 | Taylor | |

* cited by examiner

MULTI-LAYER TACTILE SENSOR

CROSS-REFERENCE TO RELATED APPLICATION

This application claims priority from German patent application DE 10 2017 109 487.3, filed on May 3, 2017. The entire content of this priority application is incorporated herein by reference.

BACKGROUND OF THE INVENTION

The present invention relates to a sensor assembly with a first, second and third layer of flexible material. The layers form a pressure-sensitive sensor having at least two sensor cells.

Such a sensor is known from DE 10 2015 120 368 B3, for example.

Generic multi-layer sensors are characterized by having at least one layer of a pressure-sensitive material that changes its electrical volume resistance at the point of loading under a local mechanical loading. Electrodes above and below the pressure-sensitive layer detect the change in resistance and thus make it possible to determine the location and the strength of a pressure load on the sensor assembly. In this way, flexible, flat sensors can be created that can be used in safety mats or input devices.

The basic principle of such tactile sensors is described in GB 2 115 555 A. GB 2 115 555 A discloses a tactile sensor in which the pressure-sensitive layer is formed in the form of an elastic mat. The mat can be a textile woven or felt material that is permeated with a carbon or metallic additive, making the mat conductive overall. The fibers of the mat, which have been made conductive, act together under a pressure load on the mat, so that a contact resistance through the mat changes in the place of the pressure load. According to GB 2 115 555 A, strip-shaped electrodes are arranged matrix-like above and below the mat to measure the variable volume resistance and coupled to an electrical circuit. The electrodes are, for example, metallic foils or metal-added silicones. Via a voltage applied to an upper and a lower electrode, the electrical resistance in the overlap area of the respective electrodes can be determined and thus the contact resistance of the elastic mat at this location. The measured volume resistance in turn allows conclusions to be drawn about the respective pressure load at this point. By determining in succession the resistance between an upper and a lower electrode, a pressure distribution over the elastic mat can be determined.

The measuring principle is therefore based on determining the variable volume resistance of the pressure-sensitive layer in order to determine a pressure distribution. Decisive for the properties of the sensor is therefore the nature of the pressure-sensitive, electrically conductive material and its ability to change its volume resistance. In case of a very thin layer, a change in the contact resistance due to a compressive load may only be marginal and thus large-area electrodes are necessary in order to detect a change in the volume resistance. The size of a sensor cell, which is determined by the overlapping areas of the electrodes, is therefore directly dependent on the layer thickness of the pressure-sensitive layer, thereby limiting unfavorably the resolution of a sensor with many sensor cells.

Another disadvantage is that very closely spaced sensor cells can influence each other, in that the variable volume resistance in the area of one cell affects the adjacent cell. In order to minimize this effect, adjacent sensor cells must therefore be spaced further apart, resulting in a dead zone between the sensor cells, in which the pressure load cannot be effectively detected.

DE 10 2007 022 871 A1 addresses these problems and proposes to at least partially interrupt the pressure-sensitive, conductive layer in order to electrically decouple two adjacent cells from each other. In a first embodiment, DE 10 2007 022 871 A1 discloses therefore a sensor, in which the pressure-sensitive, conductive layer is divided into individual pads, which are each placed at intersection points of two electrodes and are also spaced apart by air or another medium which has a greater electrical resistance. Thereby, the individual cells are electrically completely decoupled from each other, yet still areas, in which the decoupling takes place, form sections in which a pressure load cannot be effectively detected.

In a second embodiment, DE 10 2007 022 871 A1 alternatively discloses that the pressure-sensitive, conductive layer can be designed to be a continuous layer, however, individual areas of the pressure-sensitive, conductive layer are designed such, for example by cutting or milling pieces, so that webs are formed between two adjacent sensor cells which electrically decouple two adjacent sensor cells from one another. The pressure-sensitive, conductive layer thus remains continuous, but requires appropriate processing to form the webs in the form of high-impedance bridges.

Each of the variants disclosed in DE 10 2007 022 871 A1 therefore requires that the pressure-sensitive, conductive layer must be processed and adapted, either by dividing it into individual components or by converting areas into high-resistance bridges. Both make the overall design of the sensor expensive and time-consuming. In addition, restrictions with regard to resolution or dead areas in which the sensor cannot effectively detect a pressure load must be tolerated.

SUMMARY OF THE INVENTION

Against this background, it is an object of the present invention to provide a tactile sensor with which a location-dependent pressure distribution can be precisely determined and which avoids the aforementioned disadvantages. Further, it is an object to provide a sensor that is particularly flat and flexible. Yet, further it is an object to provide a sensor having a high resolution and only few dead areas in which an effective determination of the pressure load is not possible.

According to one aspect of the present invention, this object is achieved by a sensor assembly comprising a first, a second and a third layer of flexible material forming, when superposed, a pressure-sensitive sensor having at least two sensor cells, the first layer comprises a first and a second electrically conductive region which are mechanically connected to each other via an electrically non-conductive region, and the second layer comprises a third in the surface extending electrically conductive region, wherein the third electrically conductive region of the second layer overlaps the first and the second electrically conductive region of the first layer, the region of overlap defining an active region of a first and a second sensor cell, wherein the third layer is formed of a conductive elastic material that cooperates under a local mechanical load in the active region with the first and the second conductive region of the first layer so that an electrical resistance between the electrical conductive regions changes in the place of the compressive load, and wherein the sensor assembly comprises a fixation adapted to fix the first and the second layer together, wherein the fixation is arranged outside the active region so that the first and the third layer lie unloaded on top of each other in the active region and the surfaces of the first and the third layer facing each other are substantially free of a fixation.

It is therefore an idea of the present invention to determine a pressure load on the sensor not on the basis of the variable volume resistance of a layer, but on the basis of the electrical resistance resulting from the volume resistance and a contact resistance resulting from the interaction of the pressure-sensitive layer and the layers in which the electrodes are formed. In addition to the volume resistance, the contact resistance between the layers is therefore particularly important for determining the pressure load. It has been shown that even a low pressure on the sensor cell leads to a measurable change in the electrical resistance, which makes it possible to create more pressure-sensitive sensors.

A sensor cell thus not only comprises the electrically conductive material and a connection to an electrode, but rather the electrodes themselves are a part of the sensor cell and contribute significantly to the electrical character thereof. This is achieved by designing the layers in which the electrodes are formed similar to the intermediate layer and thus also preferably pressure-sensitive and elastic.

By focusing primarily on the effect of the variable contact resistance, the dependence of the sensor geometry on the pressure-sensitive material can also be reduced. In particular, the effect of crosstalk from one sensor cell to another sensor cell is minimized in an advantageous way, since it is now not the volume distance of the pressure-sensitive material that is decisive, but rather the interaction of the pressure-sensitive layer with the layers above or below, in which the electrodes are formed. As the electrodes are not only used for contacting the sensor cells, but also contribute significantly to electrical character thereof, adjacent cells are advantageously decoupled from each other by the insulation between the electrodes.

The individual layers of the sensor are fixed together in such a way that the fixation does not influence the pressure-sensitive contact resistance. This makes it possible to use advantageously the variable contact resistance in determining the pressure load. For this purpose, the layers are fixed outside an active surface of the sensor cell, so that no or at least only a very low pressure is exerted on the cells by the fixation. To keep the electrodes in position, the electrodes of the sensor are designed as electrical areas of a continuous layer which are mechanically connected to each other via a non-conductive region. The continuous layer and the mechanical connection allow fixation of the electrodes with respect to the pressure-sensitive layer in the non-conductive region, i.e. outside the active region of the sensor cells, so that the electrodes are not pressed onto the underlying pressure-sensitive material by the fixation.

The fixation is further configured such that the surfaces of the first and third layers facing each other are substantially free of fixation, i.e. in particular there is no adhesive or other binder on said surfaces in the active region of a cell that can influence the variable contact resistance. This design thus has the opposite effect to what is described in DE 10 2007 022 871 A1 mentioned above, according to which the electrodes are attached to the pressure-sensitive layer either by gluing or pressing in order to achieve a defined contact surface between them and thus minimize a variable contact resistance. This means that in contrast to a sensor according to DE 2007 022 871 A1, in which the variable contact resistance is to be "excluded", according to the present disclosure the pressure distribution is to be decisively determined by the variable contact resistance, which is achieved by disclosed fixation.

Thus, the pressure distribution is mainly determined by the variable contact resistance, whereby the fixation contributes to the fact that the variable contact resistance can develop unhindered. Since the variable contact resistance is more sensitive to a pressure load, even slight pressures can be reliably detected by the new sensor. At the same time, the cell size can be scaled down to a single yarn electrode without the effects of crosstalk from cells affecting a measurement. The "blind" areas of the sensor can also be minimized, since these are essentially only dependent on the insulation of the individual electrodes to each other and no longer on the pressure-sensitive material of the intermediate layer or its format.

In a preferred refinement, the first layer is a textile fabric in which the first and second conductive region are woven into with conductive yarn. The first layer and preferably the second layer are therefore structurally identical to the third layer, so that a measurable, variable contact resistance is particularly advantageously formed. Since the first layer is a textile fabric, for example a woven fabric, and the electrodes are formed by conductive yarn, it is also possible to easily create a continuous layer in which insulating and conductive regions alternate without the structure, especially the surface, changing significantly. At the same time, the continuous formation of the layer as a single textile fabric makes it easy to achieve mechanical coupling of the first electrical region and the second electrical region via a non-conductive region. The fixation of the layers according to the present disclosure can thus be created particularly easily and cost-effectively.

In a further preferred refinement, the conductive, elastic material of the third layer is a textile, in particular a microfiber cloth, to which a conductive additive is added. This design contributes advantageously to the fact that a pressure load can be determined significantly by the variable contact resistance between the conductive, elastic material of the third layer and the electrodes of the first and second layer, since such a microfibre cloth has a special surface, which can interact advantageously with textile-like electrodes. In addition, such a layer can be flexible and thin on the one hand and very robustly designed on the other, which makes it possible to implement particularly thin sensors that are also very robust.

In a particular preferred refinement, the additive is a carbon-based additive or a metallic additive. These have the advantage that the conductivity of the third layer can be increased in such a way that the volume resistance of the third layer is essentially negligible compared to the contact resistance. At the same time, such an additive does not change the elastic property of the material, which is decisive for the contact resistance and in particular the change in the contact resistance under a pressure load. The design thus advantageously contributes to improving the sensitivity of the sensor.

In a further preferred refinement, the fixation is a lamination and/or comprises at least one seam. A lamination or a seam are particularly suitable as a fixation to realize a sensor according to the present invention. In contrast to adhesives or other fixation agents, these fixations can be designed in such a way that they fix the layers without having a significant influence on the variable contact resistance. In addition, seams can be produced very well by machine and are therefore inexpensive. Laminating is likewise a cost-effective method of producing a fixation that can additionally also protect the sensor from external influences.

In a further preferred refinement, the fixation comprises at least one seam that is adapted to join the first and the third layer together and which extends along the non-conductive region of the first layer. By extending along the non-conductive region of the first layer and mechanically coupling the non-conductive region to the first and second conductive regions, a particularly simple and cost-effective fixation of the first and second electrical regions in relation to the second and the third layer can be achieved. In a further particular preferred refinement, the seam is also adapted to bond the second layer to the first and the third layer and to extend along the non-conductive region of the first layer and through the third conductive region of the second layer. In this way, all three layers can be joined together with a single seam and all layers can be fixed to each other. This enables a particularly inexpensive design of the sensor according to the present disclosure, which is easy to manufacture by machine.

In a further preferred refinement, the fixation is a lamination with at least one piece of foil that covers a surface of the first layer facing away from the third layer and which extends beyond the first, second and third layers. In this refinement, the sensor assembly is thus laminated, which can result in a fixation according to the present disclosure. The advantage of lamination is that in addition to a fixation of the layers outside the active surfaces, the sensor assembly is also protected, preferably waterproof, at the same time. Thereby, a particularly robust design of the new sensor assembly can be achieved.

In a further preferred refinement, the first and the second layer are a textile fabric into which the first, second and third conductive region are woven by means of conductive yarns. In this design, the second layer is thus similar to the first layer. The first and second layers can therefore be obtained particularly advantageously from the same material and particularly advantageously from one and the same workpiece. This enables a particularly inexpensive production of the sensor.

In a further preferred refinement, the conductive elastic material has a volume resistance adapted to behave linearly to an applied voltage when the applied voltage changes in the range of 0V to 5V. In this refinement, the third layer thus shows ohmic behaviour over a defined voltage range, which makes evaluation particularly easy. In particular, the volume resistance can be measured in relation to the variable contact resistance in the case of ohmic behaviour.

In a further preferred refinement, the conductive, elastic material has a temperature change coefficient between 0.75 and 1.25, and wherein the temperature change coefficient is a factor describing the maximum current change upon heating to 70° Celsius and cooling to −20° Celsius. With such an elastic material, the volume resistance can be clearly determined over a favorable range in relation to the variable contact resistance.

In a further preferred refinement, the third electrically conductive region of the second layer overlaps the first and the second electrically conductive region as well as the electrically non-conductive region of the first layer and defines a region in which the third layer has a continuous, closed surface with respect to the first and the second layer. In this refinement, the third layer is thus a continuous and, in particular, closed layer. This means that the third layer can be inserted into the sensor in one piece without further steps of adjustment. Thereby, a particularly cost-effective design of the new sensor assembly can be achieved.

In a further preferred refinement, the fixation is further designed such that the first, second and third layer lie unloaded on top of each other in the active region and the surfaces of the first, second and third layer facing each other are substantially free of fixation. In this refinement, the fixation is thus also analogous for the second layer. This has the advantage that the contact resistances at both layer transitions can be used advantageously, whereby the applied measuring principle is further enhanced.

It goes without saying that the features that are mentioned above and the features that are yet to be mentioned below can be used not only in the respective mentioned combination but rather they can also be used in other combinations or as stand-alone features without departing from the scope of the present invention.

BRIEF DESCRIPTION OF THE DRAWINGS

Exemplary embodiments of the invention are illustrated in the drawing and are explained in detail in the description below. In the drawings.

DESCRIPTION OF PREFERRED EMBODIMENTS

The same reference numbers in the respective figures denote the same parts.

Figure 1:
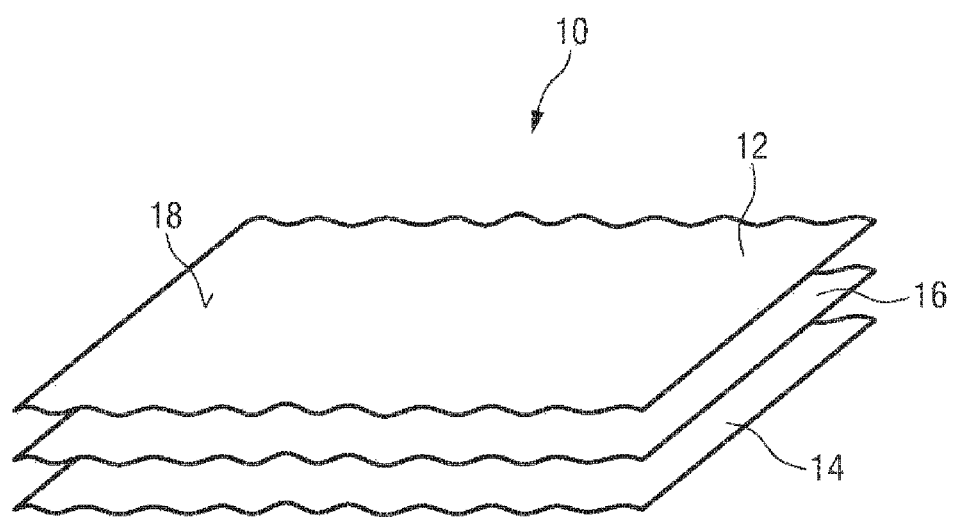
FIG. 1 shows a schematic representation of an exemplary embodiment of the new multi-layer sensor assembly.

FIG. 1 shows a schematic representation of an exemplary embodiment of the new sensor assembly, which in its entirety is denoted here with reference numeral 10.

The new sensor assembly 10 comprises a first layer 12, a second layer 14 and a third layer 16 that is between the first and the second layer. The first, second and third layer 12, 14, 16 are flat structures that form a pressure-sensitive sensor with at least two sensor cells (not shown separately here).

The first, second and third layers 12, 14, 16 therefore extend essentially in the surface and are formed cloths- or foil-like. The flexible property of the individual layer is preferably retained even after combining, so that the sensor assembly 10 is a flexible unit that can be rolled up and processed similar to a fabric sheet. In addition to the three layers that are essential for the pressure-sensitive sensor, further layers can be provided, such as a layer of waterproof material arranged above and below, with which the three layers 12, 14, 16 can be sealed watertight.

The individual layers 12, 14, 16 can be a few millimeters thick, preferably between 0.5 mm and 1.5 mm. In the area, however, the sensor assembly 10 can be extended almost arbitrarily from a few square centimeters up to several square meters. As explained in more detail below, the three layers of sensor assembly 10 are designed in such a way that a mechanical load can be registered on the surface 18 of sensor assembly 10. In preferred exemplary embodiments, in addition to determining a load, its strength and in particular its position on the surface 18 of the sensor assembly 10 can also be determined. For this purpose, the first, second and third layers 12, 14, 16 are specially designed as explained in more detail below with reference to FIGS. 2 and 3.

Figure 2:
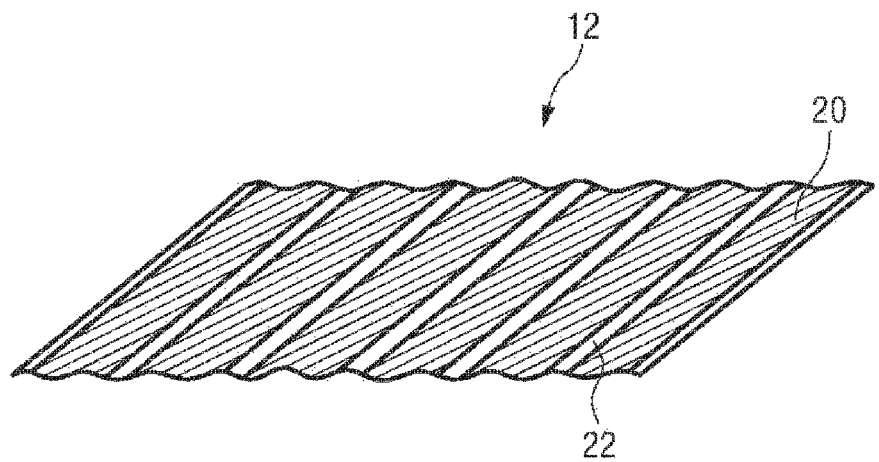
FIG. 2 shows an exemplary embodiment of the first or second layer of a newسensor assembly.

FIG. 2 shows an exemplary embodiment of a first layer 12 of the new sensor assembly 10, which in this preferred embodiment is a textile fabric in which electrical structures are incorporated. Preferably the first layer 12 is a fabric into which an electrical structure is incorporated by the use of electrically conductive threads and electrically non-conductive threads. As shown in FIG. 2, electrically conductive regions 20 and electrically non-conductive regions 22 alternate here. In the electrically conductive regions 20, the weft threads are made of electrically conductive yarn during weaving, while in the non-conductive regions 22 ordinary non-conductive yarn is used as weft threads, resulting in the stripe-like pattern shown here. The width of the strip-like electrical conductive regions 20 and the width of the strip-like electrically non-conductive regions determine the size and geometry of a sensor cell, and thus the resolution of the pressure sensitive sensor, as explained in more detail below. While here each of the conductive and non-conductive regions, respectively, have the same width, in other embodiments the widths over the surface of the first layer 12 can also vary. This has the advantage that the resolution of the sensor can be adapted to the respective requirement.

In preferred exemplary embodiments, the second layer 14 is identical to the first layer 12. This means that the first and second layers 12, 14 can be obtained from one and the same workpiece. Thereby, a particularly cost-effective and efficient production of the new sensor assembly can be achieved. For this purpose, the workpiece is divided into two parts of equal size which are rotated relative to each other, preferably by 90°, and placed on top of each other, whereby the third layer is placed in between the first and the second layer, as described below with reference to FIG. 3.

Figure 3:
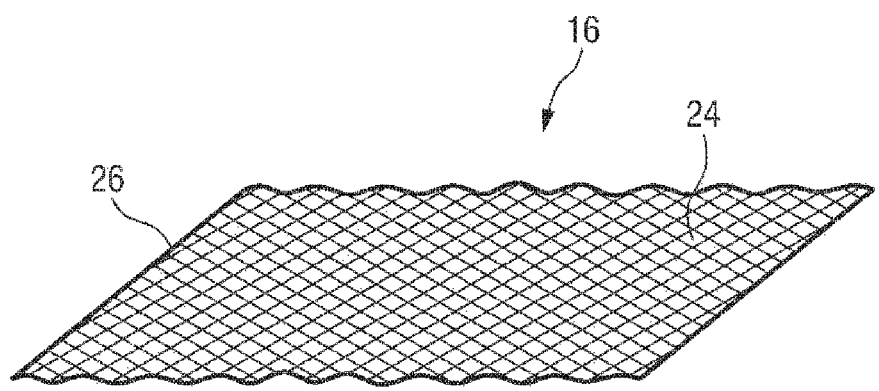
FIG. 3 shows an exemplary embodiment of the third layer of the new sensor assembly.

FIG. 3 shows an exemplary embodiment of a third layer 16 of the new sensor assembly 10, the third layer being formed of a pressure-sensitive, conductive material 24 and arranged between the first layer 12 and the second layer 14. The pressure-sensitive material 24 has a specific volume resistance which changes under mechanical load. In particular, the pressure-sensitive material is elastic so that it returns to its original shape after a mechanical load is removed.

The third layer 16 is preferably made of non-woven, conductive fabric. Particularly preferably the third layer is a non-woven microfibre cloth 26 that has fibers which are coated with a conductive coating. The coating can be, for example, a carbon-based coating or a metallic coating. The coating makes the third layer conductive. The surface of the third layer is preferably coarse. In particular, the surface of the third layer is adjusted to the surface of the first and the second layer, so that a contact resistance between the surfaces is minimized when pressed together. Once the load is removed, the surfaces detach themselves from each other, so that the original contact resistance is achieved. A hysteresis is as low as possible.

In a preferred exemplary embodiment, the third layer 16 is placed in one piece between the first and second layer 12, 14. This means that the third layer 16 has a continuous and especially closed surface, which extends homogeneously between the first and the second layer. Advantageously, the third layer does not have to be adapted separately for the formation of the individual sensor cells, as explained in more detail with reference to the following FIG. 4.

Figure 4:
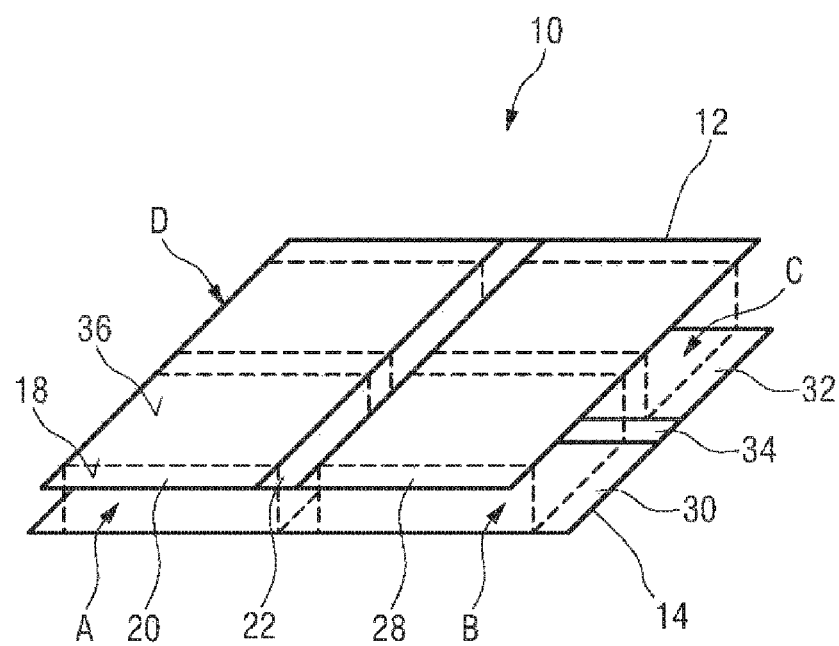
FIG. 4 shows a schematic representation of an exemplary embodiment of the new sensor assembly with four sensor cells.

FIG. 4 shows a simplified exemplary embodiment of the new sensor assembly 10 with a first layer 12 and a second layer 14. The third layer, which is arranged between the first layer 12 and the second layer 14, has been omitted in this sensor assembly 10 for better representation.

The first layer 12 has a first electrically conductive region 20 and a second electrically conductive region 28. An electrically non-conductive region 22 is arranged between the first electrically conductive region 20 and the second electrically conductive region 28. The first electrically conductive region 20 and the second electrically conductive region 28 are formed together with the non-conductive region 22 from one workpiece, so that the electrically conductive regions 20, 28 and the electrically non-conductive region 22 are mechanically connected. As explained in FIG. 2, the electrically conductive regions 20, 28 and the electrically non-conductive region are preferably incorporated into a woven fabric by the use of electrically conductive threads and electrically non-conductive threads.

The second layer 14 is similar to the first layer 12. The second layer 14 has a third electrically conductive region 30 and a fourth electrically conductive region 32. The third and the fourth electrically conductive region are separated from another by a further non-conductive region 34. In this embodiment, the first layer 12 and the second layer 14 are rotated by 90° and stacked together to form four sensor cells. Sensor cells A, B, C, D of the sensor assembly 10 are formed in the regions in which the electrically conductive regions 20, 28, 30, 32 overlap.

A sensor cell A, B, C, D therefore always comprises an electrically conductive region 20, 28 of the first layer 12 and an electrically conductive region 30, 32 of the second layer 14, and the pressure-sensitive material 24 of the third layer, which extends homogeneously between the first layer 12 and the second layer 14.

The sensor cells formed by the overlapping areas define 18 active regions 36 on the sensor surface where a pressure load on sensor assembly 10 can be determined. In this embodiment, the active regions 36 are square fields spaced apart from each other by the non-conductive regions 22, 34. Preferably the non-conductive regions 22, 34 are relatively small compared to the active regions 36, so that the regions in which a pressure determination is not possible are as small as possible. Preferably, the active regions form an almost closed surface via which a pressure distribution can be determined. This is possible due to the special operating principle, which prevents crosstalk from one cell to an adjacent cell, even if the cells are arranged closely together. The operating principle for determining the pressure distribution across the sensor surface 18 is explained in more detail below with reference to FIG. 5.

Figure 5:
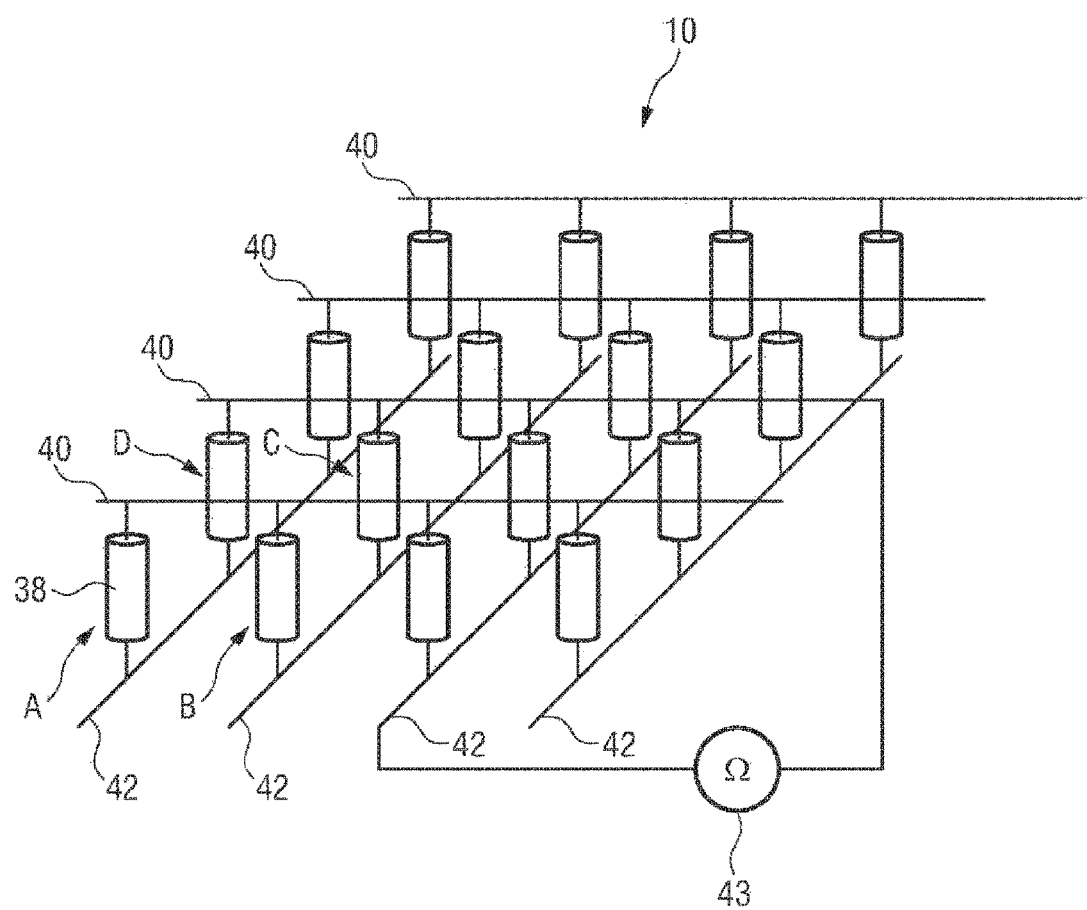
FIG. 5 shows a simplified schematic representation of a measuring circuit of an exemplary embodiment of the new sensor assembly.

FIG. 5 shows an equivalent circuit diagram of the new sensor assembly 10. The sensor assembly 10 comprises here a total of sixteen sensor cells, which are schematically illustrated here by their respective electrical resistance 38. The sensor cells can be individually contacted via first electrodes 40 and second electrodes 42 and the electrical resistance 38 of these cells can be determined. The first and second electrodes 40, 42 are connected in pairs to an evaluation circuit 43, for example via multiplexers connected in between (not shown here). The evaluation circuit 43 is configured to determine the electrical resistance 38 of a sensor cell. For example, a simple evaluation circuit can determine the voltage drop between the first and second electrodes 40, 42 and use this information to determine the respective electrical resistance 38 of the currently contacted sensor cell. It goes without saying that the evaluation circuit can also be designed more complex than shown here, for example, in form of a micro-controller or a signal processing unit, which allow a more complex signal processing.

Sensor cells A, B, C, D of sensor assembly 10 are designed to change their electrical resistance at a pressure load as described above. Thus, by determining the electrical resistance of a sensor cell, the respective pressure load of the cell can directly be determined. By successively determining respective values for all sensor cells, a pressure distribution over the sensor area 18 of sensor assembly 10 can be determined.

The electrical resistance 38 comprises several individual components forming the total resistance. The pressure-variable volume resistance of the third layer and the pressure-variable contact resistance between the electrodes and the third layer are of particular importance.

While in state-of-the-art pressure sensors the electrical resistance 38 of a sensor cell depends essentially on the volume resistance that changes under pressure, the electrical resistance 38 according to the new sensor assembly 10 preferably depends on both the pressure-sensitive material 24 of the third layer, i.e. the pressure-variable volume resistance, and on the pressure-variable contact resistance that results from the interaction of the first and second electrodes of a sensor cell and the pressure-sensitive material 24 in between.

In particular, the pressure-variable contact resistance is in focus by sensors according to the disclosure, since it has been shown that the contact resistance is more significant in sensor having a certain geometry than the pressure-variable volume resistance. It is therefore also conceivable that only the pressure-variable contact resistance is taken into account and the effects of the other components of the electrical resistance 38 are either compensated by a corresponding electrical circuit or eliminated during evaluation. In particular, this requires precise knowledge of the electrical properties of the third layer, which is therefore advantageously made of a material that exhibits almost linear, i.e. ohmic, behavior.

Figure 6:
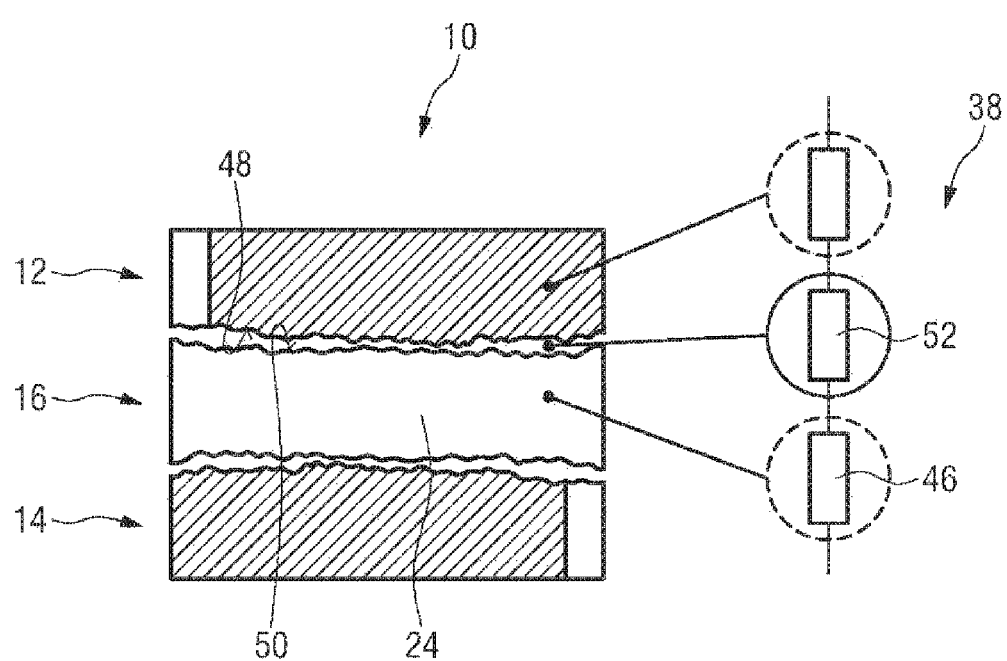
FIG. 6 shows a schematic representation of the operating principle of the new sensor assembly.

With reference to FIG. 6, the operating principle with regard to the pressure-variable contact resistance is explained in more detail.

FIG. 6 shows a cell of the new sensor assembly 10 in a cross-sectional view (left) and a corresponding electrical equivalent circuit diagram (right). The sensor cell comprises a first layer 12, a second layer 14 and a third layer 16. The layers 12, 14, 16 lie essentially freely on top of each other, with at least the first layer 12 and the third layer 16 being formed from elastic material. Preferably, the second layer 14 is similar to the first layer 12.

The pressure-sensitive material 24 of the third layer 16 has a specific pressure-variable volume resistance 46. The volume resistance 46 is the same for all sensor cells in the unloaded state. Preferably, the volume resistance 46 is linear over a defined voltage range. In other words, the conductive, elastic material 24 of the third layer 16 shows ohmic behaviour over a defined voltage range, especially in the voltage range from 0V to 5V. The volume resistance 46 can therefore preferably be determined clear without ambiguity by measurement.

In series to the volume resistance 46, a contact resistance 52 is formed between the surface 48 of the first layer 12 and the surface 50. The contact resistance 52 is also pressure-variable and, like the volume resistance 46, changes depending on the pressure load of the sensor cell. This means that the surface 48 of the first layer and the surface 50 of the third layer 16 are designed in such a way that they interact under a compressive load, for example by engaging one another, which increases the contact surface between the two layers and reduces the contact resistance 52. The pressure-variable contact resistance 52 can be the same for all sensor cells in the unloaded state. Alternatively, depending on the geometry of a sensor cell, the pressure-variable contact resistance 52 can also be set individually for a cell in the unloaded state. The evaluation must be adapted accordingly.

Both the volume resistance 46 and the contact resistance 52 are designed such that, when a cell is no longer mechanically loaded, their original values are taken up again with the lowest possible hysteresis. For example, the elasticity of the first and the third layer 12, 16 is such that the surface 48 and the surface 50 are pulled apart as soon as the pressure on the cell decreases.

As described above, the pressure-variable volume resistance 46 and the pressure-variable contact resistance 52 are both components of the total resistance 38 of a sensor cell of the new sensor assembly 10. It has been shown that when a pressure load is applied, advantageously the contact resistance 52 initially changes before the volume resistance 46 of the pressure-sensitive material 24 of the third layer 16 changes. In other words, by using the variable contact resistance 52 a more sensitive pressure measurement can be achieved than with conventional pressure sensors, which primarily focus on the volume resistance of the pressure-sensitive material 24 in order to determine a pressure load.

To benefit from the effect of the contact resistance 52 as a primary measured variable, it is advantageous if the surfaces 48, 50 of the first and the third layer 12, 16 facing each other are "free". Free in this context means that the first layer 12 and the third layer 16 can be fixed to each other, but the fixation does not influence the interaction of the surfaces, for example by pressing the surfaces against each other. The fixation is therefore of particular importance for the sensor according to the disclosure, which is explained in more detail in FIG. 7 below.

Figure 7:
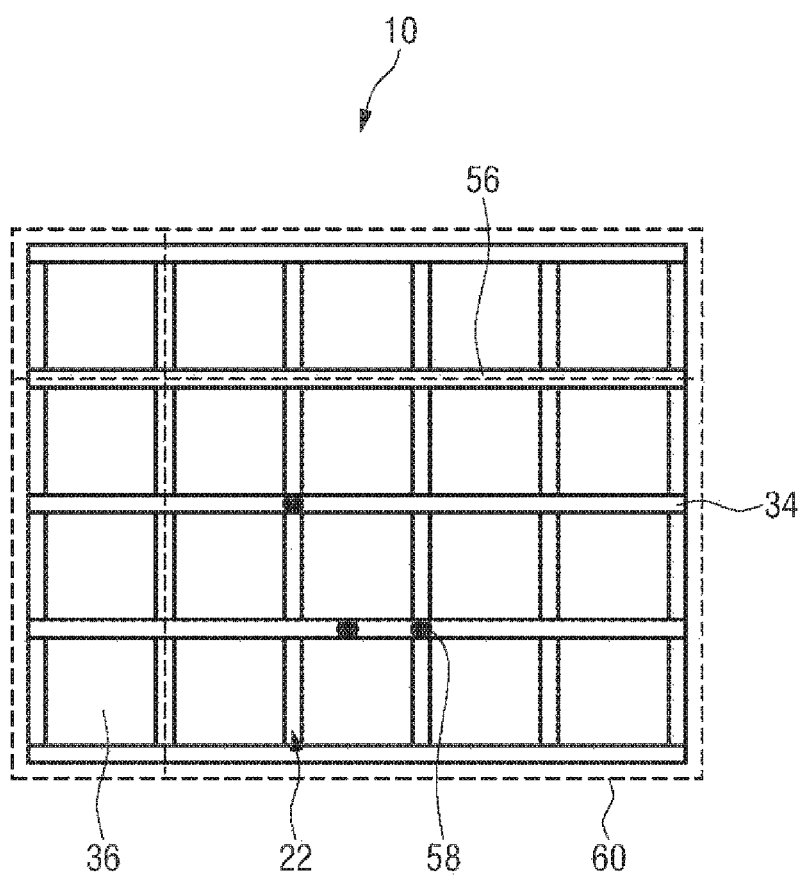
FIG. 7 shows a plan view of an exemplary embodiment of the new sensor assembly.

FIG. 7 shows the new sensor assembly 10 in plan view. The sensor assembly 10 here comprises twenty sensor cells with rectangular active regions 36. The active regions 36 are defined by the overlapping regions of the electrically conductive regions of the first layer and the second layer and are spaced apart by the electrically non-conductive regions 22, 34.

The sensor assembly 10 shows here exemplarily different fixations according to the present disclosure.

The first fixation 56 is a seam running along the non-conductive region 34. The seam extends through the first layer and at least the third layer, and preferably also through the second layer to fix them together. In a preferred exemplary embodiment, such a seam is arranged in each electrically non-conductive region 22, 34. Since the first, second and third layers are preferably textiles, a seam can be produced in a particularly simple manner. The decisive factor about the fixation is that it runs through the non-conductive regions of at least one of the first or second layer, so that it is guaranteed that the fixation 56 does not run over the active region 36 of a sensor cell.

Seam 56 thus fixes the layers together without affecting the contact surfaces between the first and the third layer. The advantage of a seam is that it can be made particularly narrow, so that only a very narrow electrically non-leading area is sufficient to accommodate the seam. Thereby, dead areas of the sensor can be kept to a minimum. However, it goes without saying that a seam 56 is only one way of joining the first, second and third layers together. Other alternatives are conceivable.

For example, as indicated here by the reference numeral 58, a second fixation may be realized by a point-by-point fixation of the first, second and third layers. In this case, the second fixation 58 is also arranged outside the active regions 36 of the sensor cells.

In addition, the first and the second fixations 56, 58 are not limited to seams, but can also be other joints, such as adhesive joints, provided that the adhesive is located between the layers outside the active regions 36 of the sensor cells. It is therefore decisive for the fixations according to the disclosure that the contact surfaces 48, 50 in the active region 36 of a cell can interact freely and without any fixation, so that advantageously the pressure-dependent contact resistance in the sense of the disclosure can develop itself.

As an alternative to the above described direct fixation of the first, second and third layer, the layers can also be indirectly fixed. This third fixation is indicated here by the reference numeral 60. The third fixation 60 encloses the sensor assembly 10 and is thus also arranged outside the active region of the sensor cells. For example, the third fixation 60 can be created by laminating the pressure-sensitive sensor. During lamination, a piece of foil is provided above and below the sensor assembly 10 comprising means with which it is bonded to the surface of the first or second layer facing away from the third layer. The foil pieces extend beyond the individual layers and are glued together at the edges. Thus, the individual layers are fixed to each other without the surfaces 48, 50 of the sensor cells being affected by the fixation.

The fixations allow advantageously focusing on the pressure-variable contact resistance when determining the pressure distribution, which makes it possible to create a more pressure-sensitive, but at the same time robust, tactile sensor.

It goes without saying that in addition to the above-mentioned fixations 56, 58, 60, other fixations are conceivable. In particular, the disclosed fixations may be combined with each other to form a sensor according to the present disclosure. The decisive factor for the fixations is that the individual layers within the sensor cells lie unloaded and freely on top of each other, so that the pressure-variable contact resistance can develop.

Figure 8:
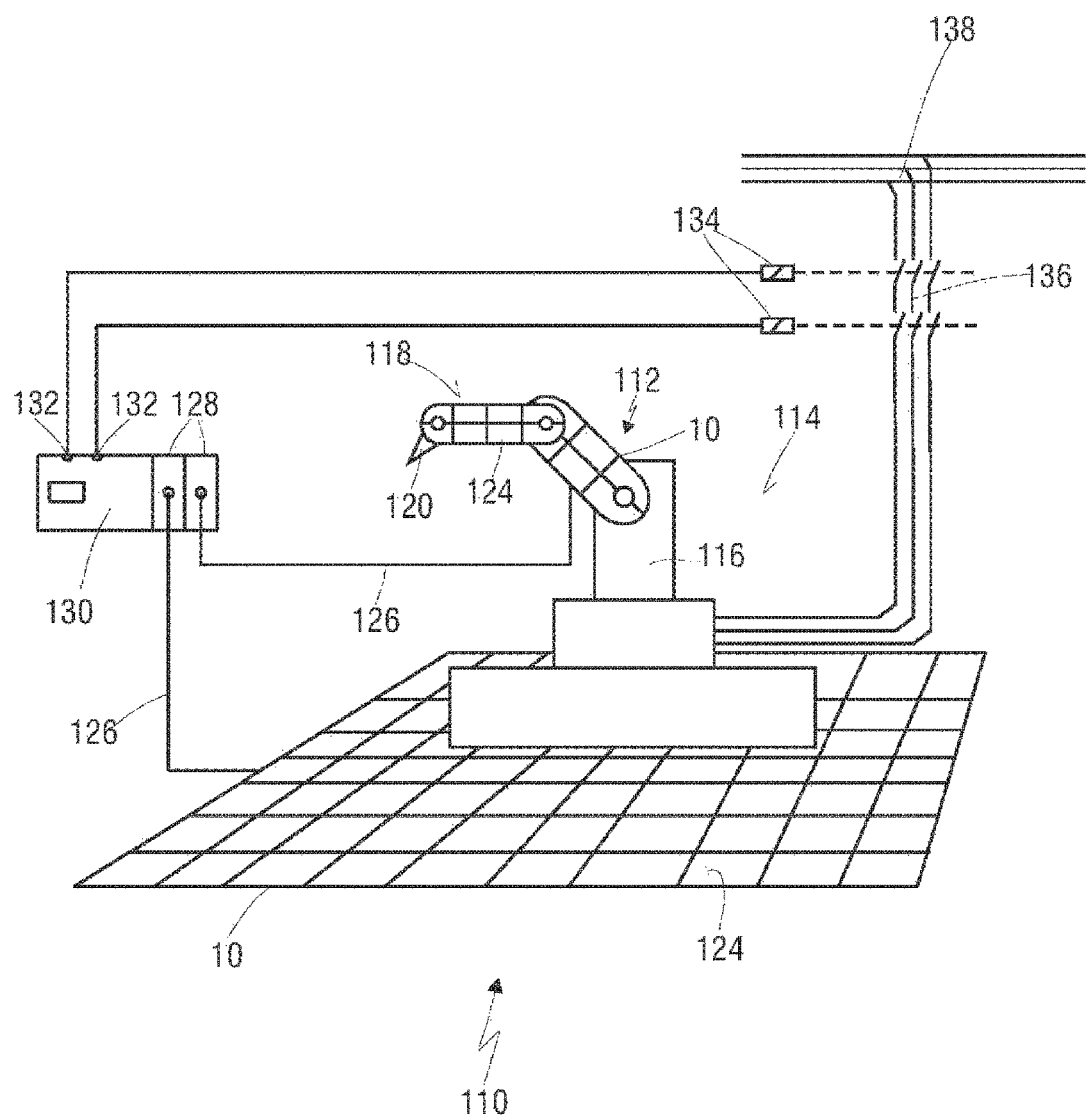
FIG. 8 shows a schematic representation of two applications in which an exemplary embodiment of the new sensor assembly is used.

In the following, FIG. 8 shows applications in which the new sensor assembly can advantageously be used. It goes without saying that the sensor assembly according to the present disclosure is not limited to these preferred exemplary embodiments.

FIG. 8 shows two exemplary embodiments of the new sensor assembly 10 used as a safety device 110, 112 for safeguarding a technical installation. Both safety devices 110, 112 monitor a technical installation 114, which is illustrated here as an automatically operating robot 116. For example, the robot 116 can be a cutting or welding robot in a production or assembly line.

The robot 116 to be monitored has a freely movable robot arm 118 with a tool 120 attached to its end. The rotation and swivel range of the robot arm 118 defines an operating range of the robot 116, which represents a hazardous area of the robot 116. Entering the hazardous area—both unauthorized and authorized—must be detected so that the robot can be transferred into machine state that is harmless to persons or objects. The detection is carried out here by the safety devices 110 and 112, which are coupled to a safety system 130.

The safety system 130 can be an output switching device in the meaning of EN ISO 13856-1, such as a simple safety relay, a configurable safety controller or a programmable control unit. The safety system 130 is configured to put the technical installation 114 into a safe state for personnel, for example by de-energizing the technical installation 114.

The safety device 110 according to the first exemplary embodiment is a safety mat which is arranged on the floor in an area around the technical installation 114. The safety device 112 according to the second exemplary embodiment is a cover of the robot arm 118, which acts as the touch-sensitive "skin" of the robot 116. Both safety devices 110, 112 comprise sensor assembly 10 according to the disclosure, which is formed by a large number of individual sensor cells 124. The second exemplary embodiment in particular illustrates the flexibility of the new sensor assembly 10, so that the sensor assembly can be adapted to different shapes, such as here, for example, the shape of the robot arm 118.

As explained above, the sensor assembly 10 is configured to detect a pressure change in one of the sensor cells 124 and to generate an appropriate output signal depending on the detection. The output signal is transmitted via lines 126 to input modules 128 of the safety system 130, which evaluates the signals and triggers a reaction depending thereon. In this embodiment, the safety system 130 is connected for this purpose via outputs 132 to contactors 134, whose working contacts 136 are arranged in a power supply 138 of the robot 116.

If a sensor cell 124 of the safety mat 110 in the hazardous area of the technical installation 114 is loaded or if a contact with an object or a person is detected by the robot skin 112, the safety system 130 switches off the outputs 132, so that the contactors 134 are deactivated by opening the working contacts and the technical installation 114 is de-energized 136. By de-energizing, the technical installation 114 is brought into a safe state for persons or objects.

It goes without saying that de-energizing the technical installation 114 is only one way of putting the technical installation 114 into a safe state. Alternatively or in addition, in other embodiments, the safety system 130 can also control the motion of robot 116 in order to achieve a safe state, for example retracting the robot arm 118 by the robot 116. It is also conceivable that the output signals of the sensor assembly 10 of the first safety device 110, the sensor assembly 10 of the second safety device 112 or the output signals of other safety devices are considered in combination with each other and that the safety system 130 makes a decision about the control of robot 116 from the combined evaluation. Other safety devices may include electro-sensitive protective equipment (ESPE), such as light barriers or light curtains, or a safe camera system.

For the above pressure-sensitive safety devices the general rules and requirements for safe design and testing as specified in EN ISO 13856-1 shall be observed. In particular, the standard specifies the minimum safety requirements with regard to performance, labelling and documentation. For example, it must be ensured that a safety device for safeguarding a technical installation is fully functional within a defined temperature range of −20° Celsius to 70° Celsius. These requirements can be met particularly well and cost-effectively by the new sensor assembly 10 according to the present disclosure.

It is understood that the new sensor assembly 10 is not limited to the above-mentioned applications, but can also be used in other advantageous ways, especially in applications that place high demands on the robustness, reliability and accuracy of the pressure-sensitive sensor used.

What is claimed is:

1. A sensor assembly comprising a first, a second and a third layer of flexible material forming, when superposed, a pressure-sensitive sensor having at least two sensor cells,
   the first layer comprises a first and a second electrically conductive region which are mechanically connected to each other via an electrically non-conductive region, and the second layer comprises a third electrically conductive region,
   wherein the third electrically conductive region of the second layer overlaps the first and the second electrically conductive regions of the first layer, the region of overlap defining an active region of a first and a second sensor cell,
   wherein the third layer is formed of a conductive elastic material that cooperates under a local mechanical load in the active region so that an electrical resistance between the overlapping electrical conductive regions of said first and second layers changes in the place of the compressive load,
   wherein the sensor assembly comprises a fixation adapted to fix the first and the second layers together, wherein the fixation is arranged outside the active region so that the first and the third layers lie unloaded on top of each other in the active region and the surfaces of the first and the third layers facing each other are substantially free of a fixation, and
   wherein the fixation is a lamination with at least one piece of foil that covers a surface of the first layer facing away from the third layer and which extends beyond the first, second and third layers.

2. The sensor assembly according to claim 1, wherein the first layer is a textile fabric in which the first and second conductive regions are woven into with conductive yarn.

3. The sensor assembly according to claim 1, wherein the conductive, elastic material of the third layer is a textile, in particular a microfiber cloth, to which a conductive additive is added.

4. The sensor assembly according to claim 3, wherein the additive is a carbon-based additive or a metallic additive.

5. The sensor assembly according to claim 1, wherein the fixation is a lamination and/or comprises at least one seam.

6. The sensor assembly according to claim 1, wherein the fixation comprises at least one seam that is adapted to join the first and the third layers together and which extends along the non-conductive region of said first layer.

7. The sensor assembly according to claim 6, wherein the seam is further adapted to bond the second layer to the first and the third layers and to extend along the non-conductive region of the first layer and through the third conductive region of the second layer.

8. The sensor assembly according to claim 1, wherein the first and the second layers are a textile fabric into which the first, second and third conductive regions are woven into with conductive yarn.

9. The sensor assembly according to claim 1, wherein the conductive elastic material has a volume resistance adapted to behave linearly to an applied voltage when the applied voltage changes in the range of 0V to 5V.

10. The sensor assembly according to claim 1, wherein the conductive elastic material has a temperature change coefficient between 0.75 and 1.25, and wherein the temperature change coefficient is a factor describing the maximum current change upon heating to 70° Celsius and cooling to −20° Celsius.

11. The sensor assembly according to claim 1, wherein the third electrically conductive region of the second layer overlaps the first and the second electrically conductive regions as well as the electrically non-conductive region of the first layer and defines a region in which the third layer has a continuous, closed surface with respect to the first and the second layers.

12. A sensor assembly comprising a first, a second and a third layer of flexible material forming, when superposed, a pressure-sensitive sensor having at least two sensor cells,
   the first layer comprises a first and a second electrically conductive region which are mechanically connected to each other via an electrically non-conductive region, and the second layer comprises a third electrically conductive region,
   wherein the third electrically conductive region of the second layer overlaps the first and the second electrically conductive regions of the first layer, the region of overlap defining an active region of a first and a second sensor cell,
   wherein the third layer is formed of a conductive elastic material that cooperates under a local mechanical load in the active region so that an electrical resistance between the overlapping electrical conductive regions of said first and second layers changes in the place of the compressive load,
   wherein the sensor assembly comprises a fixation adapted to fix the first and the second layers together, wherein the fixation is arranged outside the active region so that the first and the third layers lie unloaded on top of each other in the active region and the surfaces of the first and the third layers facing each other are substantially free of a fixation, and
   wherein the fixation is further designed such that the first, second and third layers in the active region lie unloaded on one another and the surfaces of the first, second and third layers facing one another are substantially free of fixation.

13. A safety device having a sensor assembly according to claim 1.

* * * * *